(12) United States Patent
Zamir et al.

(10) Patent No.: US 6,999,957 B1
(45) Date of Patent: *Feb. 14, 2006

(54) SYSTEM AND METHOD FOR REAL-TIME SEARCHING

(75) Inventors: Oren Zamir, Ramat-Hasharon (IL); Guy Windreich, Rishon Lezion (IL); Guy Engelhard, Petach-Tiqua (IL); Sharon Fridman, Givata'im (IL); Edo Segal, Los Angeles, CA (US); Arik Kopelman, Hod-Hasharon (IL)

(73) Assignee: The Relegence Corporation, New York, NY (US)

( * ) Notice: Subject to any disclaimer, the term of this patent is extended or adjusted under 35 U.S.C. 154(b) by 751 days.

This patent is subject to a terminal disclaimer.

(21) Appl. No.: 09/655,185

(22) Filed: Sep. 5, 2000

Related U.S. Application Data

(63) Continuation-in-part of application No. 09/481,206, filed on Jan. 11, 2000.

(51) Int. Cl.
*G06F 17/30* (2006.01)
*G06F 15/16* (2006.01)

(52) U.S. Cl. .......................................... 707/3; 709/206

(58) Field of Classification Search ................ 709/203, 709/206, 218, 201; 707/1, 2, 3, 4, 5
See application file for complete search history.

(56) References Cited

U.S. PATENT DOCUMENTS

| | | | |
|---|---|---|---|
| 5,724,424 A | 3/1998 | Gifford | |
| 5,886,746 A | 3/1999 | Yuen et al. | |
| 5,890,152 A * | 3/1999 | Rapaport et al. | 707/6 |
| 5,970,206 A | 10/1999 | Yuen et al. | |
| 6,052,145 A | 4/2000 | Macrae et al. | |
| 6,091,882 A | 7/2000 | Yuen et al. | |
| 6,101,493 A | 8/2000 | Marshall et al. | |
| 6,226,635 B1 * | 5/2001 | Katariya | 707/4 |
| 6,269,368 B1 * | 7/2001 | Diamond | 707/6 |
| 6,311,189 B1 * | 10/2001 | deVries et al. | 707/102 |
| 6,327,590 B1 * | 12/2001 | Chidlovskii et al. | 707/5 |
| 6,332,154 B1 * | 12/2001 | Beck et al. | 709/204 |
| 6,381,594 B1 * | 4/2002 | Eichstaedt et al. | 707/3 |
| 6,574,632 B1 * | 6/2003 | Fox et al. | 707/102 |
| 6,591,245 B1 * | 7/2003 | Klug | 705/10 |

OTHER PUBLICATIONS

Ounis, I.; Pasca, M.; Database Engineering and Applications Symposium, 1997. IDEAS '97. Proceedings., International, Aug. 25-27, 1997, pp.: 397-402.*

(Continued)

*Primary Examiner*—Paul H. Kang
(74) *Attorney, Agent, or Firm*—Seth D. Levy; Davis Wright Tremaine LLP

(57) ABSTRACT

A system and method for real time search that matches a plurality of client queries against a plurality of terms extracted from a plurality of information packets. The method and system allows implementation of complex matching techniques in real time. The method and system provides that a group of information packets originating from a single information source is checked in order to provide a query result. In addition, it provides that received information packets and information representative of a reception of extracted terms are stored in a manner that allows fast insertion and deletion of content.

37 Claims, 6 Drawing Sheets

OTHER PUBLICATIONS

Co-pending U.S. Appl. No. 09/618,656 entitled: "Apparatus and Method for Dynamic Advertisement", filed Jul. 18, 2000.

Co-pending U.S. Appl. No. 09/654,801 entitled: "System and Method for Real-Time Alerts", filed Sep. 5, 2000.

Co-pending U.S. Appl. No. 09/654,634 entitled: "Media Monitor Page and Method for Creating the Same", filed Sep. 5, 2000.

Co-pending U.S. Appl. No. 09/654,822 entitled: "Media Monitor System", filed Sep. 5, 2000.

* cited by examiner

SEARCH ENGINE

THE TERMS INDEX

SYSTEM AND METHOD FOR REAL-TIME SEARCHING

RELATED APPLICATIONS

This application is a continuation in part of application U.S. Ser. No. 09/481,206 filed Jan. 11, 2000.

FIELD OF THE INVENTION

The present invention generally relates to search engines utilizing content based queries to identify query-related relevant terms and, in particular, to an improved, real-time search engine for live dynamic content providing high-speed query response against a real-time collection of extracted and indexed terms.

BACKGROUND OF THE INVENTION

The quantity and diversity of informational content accessible on data networks, is increasing constantly and at a substantial rate. This development creates difficulties locating specific information content. Same difficulties arise when locating specific information content in multimedia streams, television broadcasts and radio broadcasts. Various network-based sites maintain generalized content based searching. Another problem involves the size of the collected indexes. Traditional search engines typically perform a consecutive scan of the information sources and create substantial indexes that can be later searched in response to a query. The indexes generated in this manner are usually very large on the order of many gigabytes.

Another significant disadvantage of the conventional search engines relates to the need to ensure the timeliness of the information maintained in the indexes. There is a need to provide a search engine on data networks that is characterized by a fast response and high update rate of the index, both in relation to an addition of content to the index and in relation to a deletion of content from said index. For large collections, the indexes need to be rebuilt to add or remove information sources-terms relations. The process of building and rebuilding an index involves considerable time delay as known index formation processes are one order of a magnitude slower than the typical rate of source content accumulation rate.

Prior art search engines are optimized to huge amounts of data. Therefore, great effort is invested minimizing index sizes in order to keep as much index data as possible in the fast RAM (Read Only Memory) storage instead of being kept on external storage devices. As a result, the indexing process as well as index data deletion are complicated and slow processes.

Therefore, there is an urgent need for a search engine that is fast, accurate, scalable without significant loss of performance and can be maintained to be significantly current in real-time. Especially there is a need to provide such a search engine that is further adapted to perform a complex search in real time.

SUMMARY OF THE INVENTION

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a fast, accurate, scalable without significant loss of performance method for real time search that is maintained to be significantly current in real-time. The method comprising the steps of: (A) Receiving a client query, said client query regarding a content of at least some information packets provided by a plurality of information sources. (B) Matching at least a portion of said client query against at least a portion of a plurality of extracted terms, said extracted terms being extracted from a plurality of information packets provided by a plurality of information sources. Said extracted terms are being stored in a high update rate dynamic data structure. (C) Providing a query result to the client query.

Conveniently, said method further comprises of at least one of the following information packet processing steps, said processing steps precede an addition of content to said dynamic data base: (D) Filtering the information packets to exclude specific content information or control data. (E) Inserting the processed, filtered information packets into a buffer on the storage device. (F) Retrieving the information packets from the buffer for parsing and stemming. (G) Processing and filtering the resulting extracted terms from the information packets. (H) Storing the extracted terms into a term index structure for a predefined period of time.

Conveniently, said method further comprising an step of deleting extracted terms from the terms index structure. Preferably, said deletion is executed after an extracted term was stored for a predefined time period or when said term is not relevant.

Conveniently, said method further comprising query processing steps, said processing steps precede step (B) of matching. Said steps are: (J) Processing the queries by attaching control data. (K) Filtering the queries in a predefined manner. (L) Inserting the queries into a buffer on the storage device. (M) Retrieving the queries from the buffer, parsing and stemming the queries in order to extract queryterms. (N) Filtering the query-terms in a predefined manner. (O) Storing the queries into a queries index structure in order to be matched later against the relevant terms in the terms index structure.

The invention provides a method for real time search, said method comprising the steps of: (A) receiving a client query, said client query regards a content of at least one information packet; (B) matching at least a portion of said client query against at least a portion of a plurality of extracted terms to generate a query result, said extracted terms being extracted out of a plurality of information packets, said information packets either provided by a plurality of information sources or representative of a portion of a received signal provided from a plurality of information sources, said extracted terms are stored in a high update rate storage means; and (C) providing a query result.

Conveniently, said high update storage means allows fast insertion and deletion of content. The high update rate storage means further allows timely deletions of irrelevant or time-decayed terms and query-terms. The storage means is a term index data structure. The step of matching is preceded by at least one preprocessing step selected from a group consisting of: adding control data to said information packets; filtering the plurality of information packets; processing said extracted terms by adding control information to said extracted terms; filtering the extracted terms to generate filtered extracted terms and storing an extracted term in a term index data structure.

Conveniently, the extracted terms are extracted out of the plurality of information packets by parsing and stemming the plurality of information packets; and wherein the step of filtering further comprising a step selected from a group consisting of: (a) discarding said terms constructed of one-letter words; (b) discarding said terms constructed of frequently used words; (c) discarding said terms constructed of stop-words; and (d) discarding said terms constructed of predefined words. The control data comprising of information packet identification, information source identification and time of arrival.

The invention provides a method for real time search wherein a reception of an information packet is followed by the steps of: storing information packet with an associated packet identifier in an information packet storage means, storing extracted term information representative of a reception of at least one extracted term, said at least one extracted terms extracted from the information packet; and linking between the stored information packet and the extracted term information.

The invention provides a method for real time search wherein the deletion of an information packet is followed by a step of deleting the linked extracted term information. The information packet are stored in a messages hash, and wherein the linked extracted term information is stored in a terms hash. The extracted term information comprising of at least one information field out of a group consisting:

a last modification time field, indicating a most recent time wherein the extracted term was received; a number of channels containing term, indicating a number of information sources that provided the extracted term; a total instances field, indicating a number of times the extracted term was provided; and a terms inverted entries map, comprising of a plurality of terms inverted file entries, each entry holding information representative of a reception of the extracted term from a single information source.

The invention provides a method for real time search wherein each inverted file entry comprising of at least one field out of a group consisting of: a channel identifier, for identifying the information source that provided the extracted term;

instances number, for indicating a number of times the extracted term was provided by an information source; and time of last appearance, for indicating a most recent time wherein the extracted term was received from an information source.

The invention provides a method for real time search wherein Each information packet is further associated to a message terms key map, said message key map comprising of a plurality of message characteristic entries, each message characteristic entry associated to an extracted term being extracted from the information packet, said message characteristic entry comprising of at least one of the following fields selected from a group consisting of: a term inverted file, for pointing to the term extracted information; an instance of number, for indicating a number of time said extracted term appeared in the information packet; and an inverted file entry, for pointing to a terms inverted file entry.

The invention provides a method for real time search wherein the step of matching is preceded by the steps of: inserting an extracted term into a terms hash table and into a terms inverted file; inserting an information source identification, said information source provided the extracted term, to a terms inverted entry map table in said terms inverted file; inserting information packet data in a messages hash table; inserting the extracted term from said information packet to a messages data table; increasing a value of instances in said messages data table by one; and updating a value of information source identification in said message data table.

The invention provides a method for real time search further comprising at least one additional step selected from a group consisting of the steps of: increasing a value of total instances in said terms inverted file; updating a value of last modification time in said terms inverted file; increasing a value of instances number in said inverted entry map table associated with said information source identification in said terms inverted file; and updating a value of message time in said messages data table.

The invention provides a method for real time search wherein the step of deleting further comprises of the steps of: receiving an information packet identification, whereas the terms extracted from the information packets are to be deleted; reading the information packet identification from the messages hash table in said terms index data structure; obtaining relevant entries of said extracted terms belonging to said information packet in said messages data; and accessing said terms inverted file for each said terms entry pointed to said terms inverted file.

The invention provides a method for real time search wherein the step of deleting further comprising a step of decreasing a value of said total instances by a value of said instances number for each said terms entry pointed to said terms inverted file.

The invention provides a method for real time search wherein the step of deleting further comprising a step of deleting an extracted term by a garbage collection process and canceling a link between said term in said terms hash table and said terms inverted file.

The invention provides a method for real time search further comprising a step of storing client queries; and wherein the step of matching further comprising a step of matching client queries received and processed in the past against newly received terms to generate a past query result. The step of matching client queries received and processed in the past is followed by a step of processing the past query result and a result of the step of matching at least a portion of said client query against at least a portion of a plurality of extracted terms to generate the query result.

The invention provides a method for real time search further comprising a step of matching the client query against historical archives of informational content to generate an archive query result. The step of matching the client query against the historical archives of informational content is followed by a step of processing the archive query result and a result of the step of matching at least a portion of said client query against at least a portion of a plurality of extracted terms to generate the query result.

The invention provides a method for real time search further comprising a step of matching the client query against a semi-static database of said informational content and having a low incidence of changing to generate a semi static query result. The step of matching the client query against the semi-static database is followed by a step of processing the semi static query result and a result of the step of matching at least a portion of said client query against at least a portion of a plurality of extracted terms to generate the query result.

The invention provides a method for real time search wherein the step of matching further comprises a step of ranking information sources according to a similarity between at least a portion of information packets provided by said information sources and between the client query.

The step of ranking is followed by a step of creating a list of ranked information sources, said list forms a part of the query result. The step of ranking is based upon a parameter out of a group consisting of: a total amount of extracted terms provided by an information source in a predefined time interval; an elapsed time since the extracted term was provided by the information source in said predefined time interval; and an extracted term position in the information source.

The invention provides a method for real time search wherein an information source is selected from a group consisting of: data network providers, chat channels providers, news providers, and music providers.

The invention provides a method for real time search wherein information packets comprise of content selected from a group of: text, audio, video, multimedia, and executable code streaming media.

The invention provides a method for real time search wherein the step of matching further involves a step of computing a similarity between a client query and a group of at least one information packet. The group of at least one information packet comprising of at least one information packet received from a single information source.

The invention provides a method for real time search wherein a similarity between at least a portion of information packets provided by said information sources and between the client query, said similarity reflects at least one of the following parameters: a total amounts of extracted terms being received from at least one information source during a predefined time interval; a number of relevant extracted terms being received from at least one information source during the predefined time interval; a total number of information sources being searched during the predefined time interval; an elapsed time since a last appearance of a relevant extracted term from an information source during the predefined time interval; a position of relevant extracted terms in at least one information source; extracted term in proximity to a relevant extracted term; a part of speech of a relevant extracted term; and a relevant extracted term frequency and importance in a language of the information source.

The invention provides a method for real time search wherein the step of matching implements a matching technique selected from a group consisting of:

boolean based matching; probabilistic matching; fuzzy matching; proximity matching; and vector based matching.

The invention provides a method for real time search wherein the step of matching implements complex matching techniques.

Conveniently, said method further comprising of a step of ranking information sources from which the extracted terms originated according to a relevance of the information source to the queries. Said relevance is based upon a similarity between a query term and an extracted term and upon additional factors, such as a weight factor associated to an extracted term.

The invention provided a system for real time searching, the system is adapted to be coupled to a plurality of information sources for receiving a plurality of information packets from said information sources or for receiving information packets representative of a content of a signal provided by the information sources and is further adapted to be coupled to a plurality of client systems for receiving a plurality of client requests. Said system comprising of: (a) an information packet processor, for processing said information packets and providing extracted terms. (b) a real time indexing module, for temporarily storing said extract terms. (c) a query and result manager, for matching at least a portion of a client query against at least a portion of the content of the real time indexing module and for providing a query result. Conveniently, said system further comprising of at least one of the following elements/units: (d) a message coordinator module, (e) a message buffer, (f) a message filter module, (g) a term extractor, (h) a terms filter, (i) a future search module, (j) a queries buffer, (k) a queries coordinator module, (l) a query-term extractor, (m) a query-terms filter, (n) an archive search module, and (o) a semi-static database search module.

Said system and method provide the advantage of fast index building and rebuilding by enabling fast insertions and deletions of terms and queries into the appropriate tables as well as timely deletions of irrelevant or time-decayed terms and query-terms.

Said system and method provide the advantage of real-time searching capability as a number of search options are made available like matching the queries against new terms, matching the queries against historical terms and keeping queries operative until relevant terms are found.

Said system and method provide for fast searching by keeping the entire set of terms-related indexes in fast memory thereby decreasing significantly the time needed to access the terms.

Said system and method provide the advantage of performing a complex search in real time. A complex search is based upon more than a single received extracted term originated from a single information source. Conveniently, a complex search is based upon a similarity between a query and a plurality of extracted terms received from a predetermined information channel during a predetermined period. Said extracted terms are stored in an index, until the information packet from which they were extracted are deleted from an information packet buffer. Accordingly, said method can support various matching techniques, such as Boolean based matching, probabilistic matching, fuzzy matching, proximity matching and vector based matching.

In a computing environment, a continuous stream of information packets is received from a plurality of information sources. The information packets contain content data and associated control data. The packets are inserted into dynamic storage for a preset time interval and processed for the purpose of extracting key terms from the content data. The extracted key terms are indexed and stored in dynamic data structures designed to enable fast insertion and deletion. A plurality of user-initiated queries are indexed and stored in dynamic data structures. Multiple-mode search operations are implemented by matching queries against the stored key terms and the products of the searches are returned to the users as information source identifiers. The stored information packets, the related key terms, and the stored queries are deleted from storage at the end of predefined time interval or removed automatically by other operative parameters of the system.

The present disclosure offers fast indexing and deletion operations supported by appropriate data structures. The speed of insertion and deletion operations are further decreased by maintaining the entire set of indexes in fast memory module.

According to one preferred embodiment of the invention, the search engine comprising of terms search engine, dynamic data structure and information packet processor. Information sources transmit information packets to server system. Server system comprises of a communication module that conveniently comprises of an information source communication module and a client communication module term, a search engine and a coordinator module. Through the services of the information source interface the server system receives the information packets. Conveniently, said information packets are stored in an information packets buffer. The coordinator modules fetch information packets from the information packet buffer and the packets are transferred to the search engine to be processed. The information packet processor within search engine extracts terms from the information packets, the term search engine searches the dynamic data structures for a matching key term, and if a match occurs the dynamic data structure is updated, to reflect the arrival of said term. When a query is received, the dynamic data structures are scanned to provide query results to be provided to the user.

BRIEF DESCRIPTION OF THE DRAWINGS

The present disclosure will be understood and appreciated more fully from the following detailed description taken in conjunction with the drawings in which.

DETAILED DESCRIPTION

Client system has a communication module, a User interface and a query processing unit. The user of the client system sends queries through the communication module to the server system by utilizing a user interface.

A client system provides client queries and sends them via the communication module, the network to the client communication module of the server system. Said client queries are then transfers to the search engine. The search engine processes the queries and returns the query results to the user of the client system via the client communication module, a communication line, the communication module of the client system and the user interface to be displayed to the user.

Figure 1:
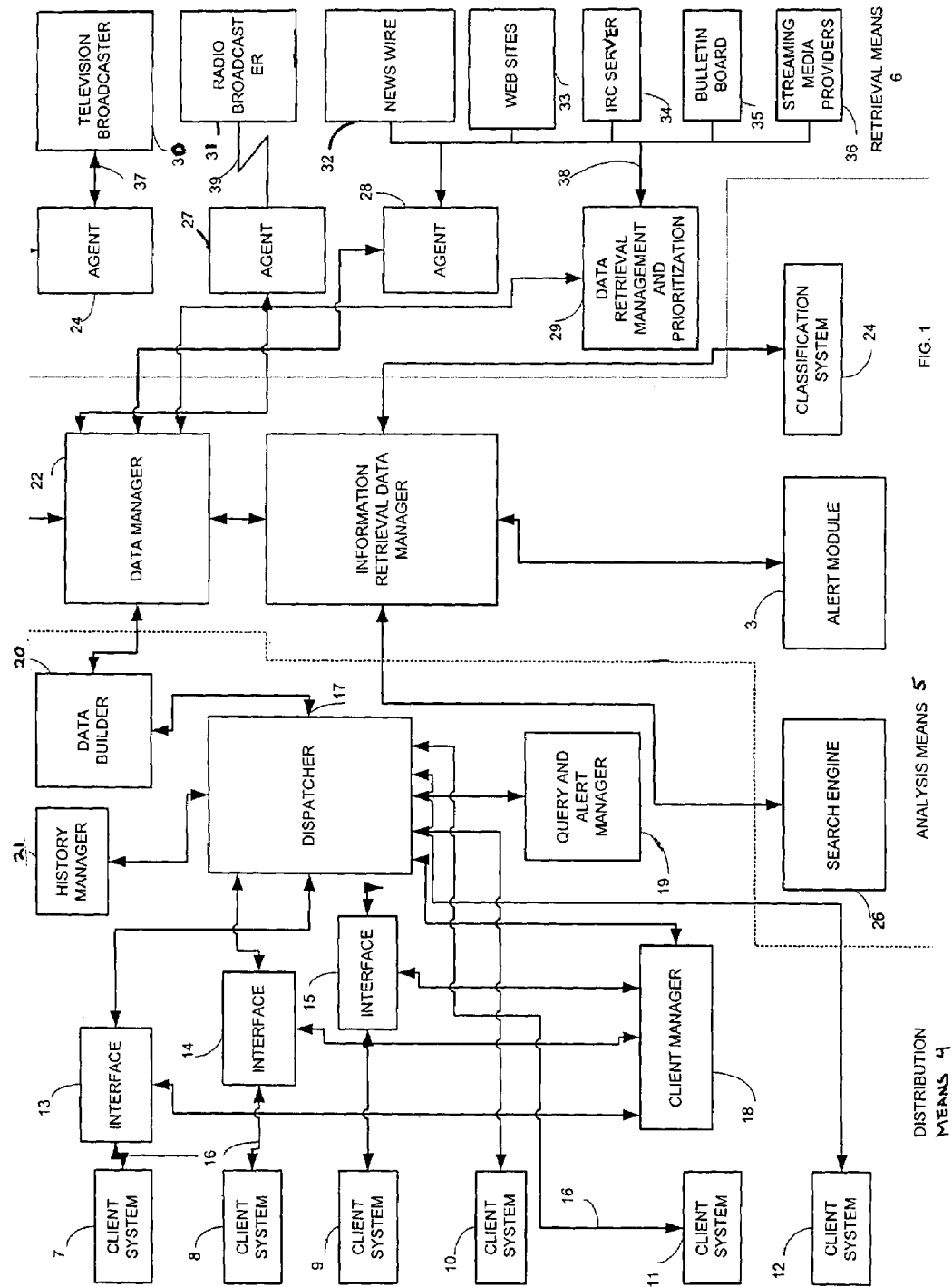
FIG. 1 is a simplified illustration of the environment in which the Search Engine is operating, in accordance with a preferred embodiment of the present disclosure.

Referring to FIG. 1 describing system 1 in which real time search engine 26 and real time alert engine 3 operate, according to a preferred embodiment of the invention. System 1 comprising of distribution means 4, analysis means 5 and retrieval means 6.

Client systems 7, 8, 9, 10, 11 and 12 provide client queries to system 10. Client systems are coupled to system 1 via network 16 and a plurality of interfaces, such as interfaces 13, 14 and 15. For convenience of explanation it is assumed that client system 7 is a personal computer system, client system 8 is a cellular phone, client system 9 is a PDA, client system 10 is a set top box coupled to a digital television, client system 11 is adapted to receive electronic mail. Accordingly, interfaces 13–15 are adapted to provide query results in various formats, according to various communication protocol, such as the TCP/IP protocol. For example, client system 8 can receive query results and alerts in WAP format. Usually, a client system receives a query result comprising of text, audio stream, video stream. Such a query result often comprises of a URL address, for allowing a client system to access desired information via a network such as the internet.

It is assumed that a client system can provide a client query and/or can update an alert criteria. System 1 accordingly provides said client system with a query result and/or an alert.

Conveniently, distribution means 4 comprising of interfaces 13–15, client manager 18, dispatcher 17, history manager 21, query and alert manager 19 and data builder 20. Client manager 18 holds client profiles. A client profile can indicate which queries were provided by the client system, at least one format in which either a query result and/or an alert is to be sent to a client system, a client identifier ID, and a list of alert criteria. Client Manager 18 manages user profiles and provides queries or alert criteria to alert engine 3 via query and alert manager 19. Each query/alert criteria is associated with said client ID. Conveniently, client manager 19 holds a table for mapping alerts to client systems.

Distribution means 4 interfaces between clients and the analysis means 5. Dispatcher 17 and interfaces 13–15 are adapted to receive client queries and/or alert criteria from client systems 7–8, to update client profiles and send said client queries/alert criteria to analysis means 5. Query results and/or alerts are generated by analysis means 5 and dispatched to client systems by distribution means 4.

Dispatcher 17 receives from client manager updated alert criteria and/or client queries and provides them to query and alert manager 19. Dispatcher 17 receives alerts and query results and in association with client manager 18 determines to which client system to send said alert and/or query result and in what format. Said alert and/or query result are provided to one of interfaces 13–15 and to the appropriate client systems. Dispatcher 17 receives query results and alerts from analysis system 5 via query and alert manager 19. In response to a reception of an alert or a query result, dispatcher 17 in association with client manager 18 determine which information to include in a query result or alert to be sent to a client system. Accordingly, a content object request is sent to data builder 20.

Data builder 20 accesses data manager 22 and provides dispatcher the requested information. For example, an alert can indicate that information source 30 provided at least one matching information packet that matches an alert criteria of client system 10. Dispatcher receives said alert and determines, in association with client manager 18 that the alert should contain additional information from the matching information source 30, such as a multimedia stream that was broadcasted by information source 30, whereas the matching information packets were driven from said multimedia stream.

Dispatcher sends data builder 20 a content object request to receive said multimedia stream. Said request usually determines the matching information ID and a content type/alert or query result format. Said multimedia stream is stored in a certain address within data manager 22, or in an external multimedia server (not shown). Said content object request to receive said address. Said address is provided to dispatcher 17 and via interface 13 and network 16 to client system 10. Eventually, said multimedia stream in displayed upon a screen of a digital television.

Conveniently, distribution means 4 maintains a list of distributor identifications ID, distributor type and user counter for each alert.

Client manager 18 is adapted to manage client system information such as client system profile, preferences, and alert criteria.

History manager 21 is adapted to maintain alert criteria and requests to update said criteria for client retrieval. History manager 21 receives requests to update an alert criteria from dispatcher 17 and stores said requests, for allowing a client system to view said requests.

Query and alert manager 19 routes client queries and alert criteria updates from dispatcher 17 and routes query results and alerts from analysis means 5 to dispatcher 17.

Retrieval means 6 comprising of a plurality of agents or receptors, such as agents 24, 27, and 28. Said agents are coupled to various information sources, such as information sources 30–36 via networks 37 and 38 or via media 39. Agents 24, 27, 28 and 29 are adapted to receive information from various information sources, such as television channel 30, radio channel 31, news provider 32, web sites 33, IRC servers 34, bulletin boards 35 and streaming media provider 36, and provide information packets to analysis means 5. For example, agent 24 receives television broadcasts or video streams via cable network 37 and convert the television broadcast or video stream to a stream of information packets. Agent 24 can comprise of a dedicated encoder, a device for extracting clause caption out of said video stream or picture recognition and analysis means. Agent 27 receives radio broadcasts, transmitted by radio channel 31 over a wireless media, and convert said transmitted audio stream to a stream on information packets. Agent 28 is coupled, via network 38 to news provider 32, web sites 33, IRC servers 34, bulletin boards 35 for retrieving information packets transmitted from said information sources via network 38. Retrieval means 6 further comprising of retrieval management and prioritization component 29 for prioritizing content sources and channels and for balancing the load between agents/receptors.

Real time alert engine 3 is adapted to receive alert criteria from query and alert manager 19 and to constantly match said alert criteria against portions of received information packets, said information packets provided by retrieval means 6. When an alert criteria is fulfilled, an alert indication is provided to query and alert manager 19. Conveniently, said alert indication comprising of a query ID and an information packet ID. Dispatcher 17 receives said alert indication accesses client manager 18 to determine which client system is to receive an alert, what additional information to provide said client system and in what format to sent the alert to said client system. Accordingly, dispatcher sends an result object request to data builder 20. Data builder 20 accesses data manager 22, receives the additional information, provides said information to dispatcher 17, and provides an alert to a client system, via an interface and network 16.

Data Manager 22 is adapted to store received information packets, audio streams and video streams. Optionally, data manager 22 is further adapted to allow data clients to get notification on data events such as data changes, data expiration, etc. and is further adapted to allow data providers to register as such.

Real time alert engine 3 allows to generate alerts in real time, in response to previously provided alert criteria and information packets being received in real time. Real time alert engine is adapted to support various alerts, such as Boolean alerts and best effort alerts.

Real time search engine 26 allows to generate query results in real time. Real time search engine 26 is adapted to support various searching techniques, such as Boolean search and best effort search.

Classification module 24 is adapted to dynamic classification of information streams/groups of information packets. Classification module 24 dynamically determines a topic of a channel, thus allowing searches and alerts based upon a topic an information stream.

Figure 2:
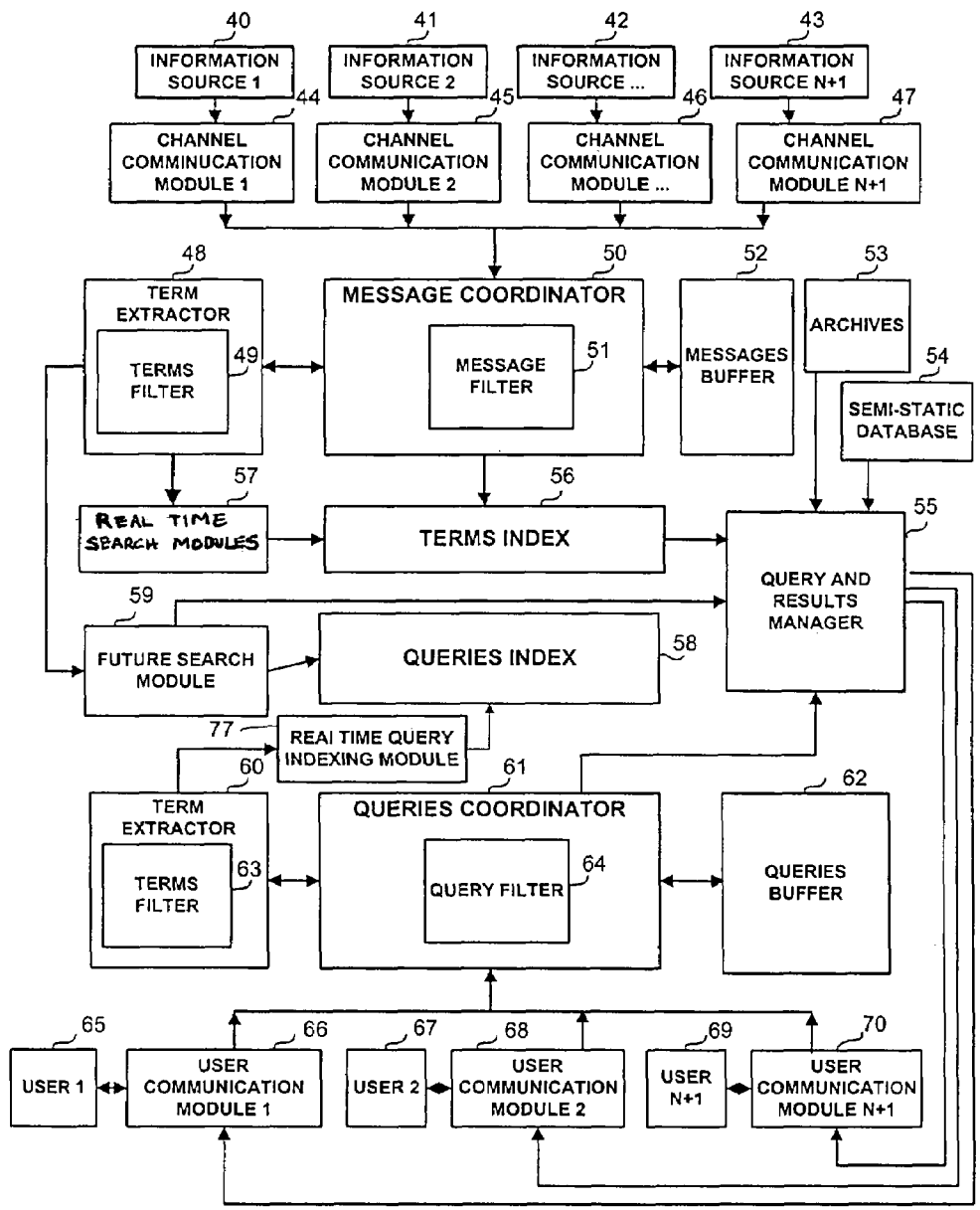
FIG. 2 is a simplified block diagram that illustrates the Search Engine operations in association with related modules and data structures, in accordance with a preferred embodiment of the present disclosure.

Referring now to FIG. 2 where the various software modules and data structures necessary for the operation of the Search Engine are shown. Although not part of the Search Engine, for the clarity of the disclosure only Information Sources 40, 41, 42, and 43 are shown connected to channel communication modules 44, 45, 46, and 47. For clarity of the disclosure FIG. 2 does not illustrate some portions of the distribution means 4, retrieval means 6 and analysis means 5 of FIG. 1.

FIG. 2 illustrates various optional modules/portions of search engine 26, such as, but not limited to, query index 58, real time query indexing module 77, archive search module 53, semi-static database search module 54, query coordinator 61 query filter 64, message coordinator 50, message filter 51, terms filters 49 and 63. Search engine 26 has: Message Coordinator module 50, Message Filter module 51, Messages Buffer 52, Term Extractor modules 48 and 60 Terms Filter modules 49 and 63, Real Time Search modules 57 and 77, Terms Index 56, future search module 59 for allowing a generation of real time alerts to a client system, queries Index 58, query and results manager 55 user communication modules 66, 68, and 70, queries coordinator 61, query filter module 64, archive search module 53, and semi-static database search module 54. Although no part of the Search Engine, for the clarity of the disclosure only, Users 65, 67, and 69 are shown connected to User Communication modules 66, 68, and 70. Query and results manager 55 matches query results to terms index 56 to generate query results. Query and results manager 55 matches alert criteria provided by future search module 59 to the content of terms index 56. future search module also referred to as alert module 59. In the preferred embodiment of the present disclosure, one information source may be a television channel that provided multimedia streams, that are later transformed into streams of information packets messages. It should be understood that in the following discussion of the present disclosure the general framework of television channels is used for purposes of description not limitation. Said search engine received text that is being either associated to the content of television channels or driven out of a multimedia stream provided by television stations. Text can be driven from a multimedia stream by various means such as special encoders, voice recognition means. Many television channels provide text in a format of clause caption. Although information packets will be referred to as messages, and information sources will be referred to as channels in the text of this document, it will be appreciated that in different embodiments of the present disclosure other sources of information could be used such as news channels, video channels, music channels, various Internet sites and the like. It will also be appreciated that in other embodiments of the present disclosure, the information packets processed could be in addition to text format in other diverse data formats such as streaming video, still pictures, sound, applets and the like.

The messages from the various channels are received through Channel communication modules 44, 45, 46, and 47 into the Search Engine module and processed therein. Channel communication modules 44, 45, 46, and 47 build and transfer the messages to Messages Coordinator Module 50 for processing. The messages transferred consist of control data such as channel ID, Message ID, timestamp of the time of arrival, and information content such as a phrase, a sentence, a news item, a music item or a video item.

Messages Coordinator 50 coordinates the handling of the incoming messages, and provides processed messages to term extractor 48 and to messages buffer 52. Messages Buffer 52 is a data structure that temporarily holds the incoming messages. In the preferred embodiment of present disclosure Messages Buffer 52 is a cyclic buffer. Message Filter 51 filters messages according to user-defined rules. For example, messages with a specific channel ID or messages containing specific text might be blocked and discarded.

Term Extractor 49 receives the messages from Messages coordinator 48, performs message parsing, and stemming (finding the lexicographic root) of the resulting terms. Once the message is parsed and stemmed, a list of terms within said message is created. The terms extracted are sent to further processing accompanied with identifying data such as channel ID, message ID and the message arrival time. Terms Filter 49 passes the terms through a series of filters, which can change or discard specific terms. For example, Terms Filter 49 can discard stop-words, frequently used words, one-character words, user-defined words, system-defined words such as "a", "about", "else", "this", and the like.

Real Time Search Modules 57, also known as Real Time Indexing Modules, accepts and stores the terms into Terms Index 56. Real Time Indexing module 57 also schedules and initiates periodically a process that removes irrelevant or time-decayed terms from Terms Index 56. Description of the process will be set forth hereunder.

Terms Index 56 consists of indexed terms and message identifiers that point to information relating to a reception of said messages and indexed terms during a predetermined period of time. Terms Index 56 is designed to enable fast term indexing and deletion. The indexing is done per term, while deletion is done per message. When the message is discarded for becoming irrelevant or time-decayed, all terms that refer to this message are deleted from Terms Index 56. Terms Index 56 is a means to realize real time search of real time content that is one of the search capabilities of the Search Engine module.

Alert module 59 functions in conjunction with Queries Index 58. Unlike real time Indexing module 57, alert module 59 matches incoming terms from the message stream against a database of more or less static queries. Therefore, alert module 59 has the ability to search for a term that is relevant to a query that was initiated at some point in time in the past as long as the relevant query is kept in the Queries Index 58. Alert module 59 enables the return of query results during a predefined time frame that begins at the query's arrival time.

Queries Index 58 holds queries for a predefined time frame in order to provide the means to alert module 59 to match terms of queries against the terms of the incoming messages. Queries Index 58 enables to return future results to queries.

According to one preferred embodiment of the invention, queries are inserted into queries Index 58 by queries coordinator 61. According to another preferred embodiment of the invention said queries also pass query terms extractor 60 and real time query indexing module 60, and undergo preprocessing steps that are analogues to preprocessing steps of a massage. Queries can contain several terms. Therefore, the relevant control information associated with each query such as query ID, timestamp and the like is indexed against all the terms of the query.

Query and Results Manager module 55 handles the queries and provides return of results to the queries by establishing a unified result from all the result sources except from Future search module 59. Result sources are the following: (a) search in Real Time Indexing module 57, (b) search in the Semi-static database by semi-static database search module 54, and (c) search in the Archive database by archive search module 53. The results from future search module 59 are passed through the Query and Results Manager 55 that sends the results on to the users 65, 67, and 69 via User communication modules 66, 68, and 70. Typically, a result consists of a sorted list of channel IDs and a score for each channel that mirrors a channel/query match. User Communication modules 66, 68, and 70 communicate between the Search Engine module and the users 65, 67, and 69. For each user 65, 67, and 69, a new instance of communication module 66, 68, and 70 is activated. User communication modules 65, 67, and 69 transfer queries initiated by the users to the Search Engine module and return results back to the users.

When a complex search is performed, query and search manager 55 analyses information regarding a various receptions of information packet, said information packets originating from a single information source.

Queries Coordinator 61 functioning similarly to Messages Coordinator 50 only with queries instead of messages. Queries Coordinator 61 receives queries from user communication modules 66, 68, and 70 and inserts the queries into the Queries Buffer 62. Upon a request from Query and Results Manager 55 Queries Coordinator 61 fetches one query from queries buffer 62 and passes it via Terms Filter 63 to Term Extractor 60. The extracted terms of the query are inserted by real time query indexing module 77 into Queries Index 58.

According to one preferred embodiment of the invention, queries Buffer 62 holds the queries in the same manner as the messages are held in the Messages Buffer 52. Queries Buffer 62 is a data structure that temporarily holds the incoming queries. In the preferred embodiment of present disclosure Queries Buffer 62 is a cyclic buffer.

According to another preferred embodiment of the invention said query buffer holds a plurality of alerts criteria, each alert criteria is stored in said buffer until a client that provided said alert criteria deletes said alert criteria.

Archive search module 53 acts on the archived data files of a channel by indexing the data and by returning results according to the indexed data. The archived data files through Archive search module 53 are a result source for the Query and Results Manager 55.

The Semi-static database search module 54 acts on the semi-static database that is an index, holding semi-static channel information such as channel ID, channel description, name, topic, and keywords. The database described "semi-static", as the information therein is structured (i.e.—said information is associated to information fields), is relatively small and changes infrequently. Semi-static database via semi-static database search module 54 is a result source for the Query and Results Manager 55.

It will be appreciated that other forms of search could be contemplated in other embodiments such as thesaurus-mode search or historical-mode search. Therefore, the above description should not be interpreted as a limitation to the present disclosure.

The operation of the Search Engine module will be described next. Information packets such as chat messages are extracted out of an incoming information stream from specific information sources such as IRC channels by channel communication modules 44, 45, 46, and 47. The messages are structured, times-stamped and transferred to the operative modules of the Search Engine. The structured messages contain control data such as channel ID, message ID, time stamp indicative of the time of arrival and content information such as textual data. The messages transferred through Message Filter 51 which blocks specific messages according to predefined rules. For example, messages originating in particular channels or having specific text content or having particular characteristics could be discarded. The filtered messages are inserted into Messages Buffer 52 which is managed and synchronized by Messages Coordinator 50. Messages coordinator 50 operates in conjunction with Messages Buffer 52, which is designed to hold the messages to be retrieved for later processing. Messages Buffer 52 is a cyclic buffer. Incoming messages are inserted at one end of the Messages buffer 52 while retrieved from the other end. The messages are kept in the buffer for a predefined period of time. Time-decayed messages may be discarded. In other embodiments of the disclosure, other methods could be used to delete messages from Messages Buffer 52 such as deletion by predefined priorities. For example, messages from a specific low-priority channel could be discarded first. When a message is deleted from message buffer 52 information relating to the reception of extracted terms that were extracted from said messages are deleted from term index. Messages are provided by message coordinator 50 to Term Extractor 48. Term Extractor 48 performs message parsing, stemming (finding the lexicographic root) of the resulting tokens and extracts the tokens from the messages. The tokens are transferred through a series of Terms Filters 49. Terms Filters 49 can change or discard a token according to predefined parameters. For example, Terms Filters 49 can discard stop-words, one-letter words, frequently used words, user-predefined words and the like.

The tokens are structured into operative terms to be used by other Search Engine modules after Term Extractor 48 attaches identifiers to the tokens such as channel ID, message ID and time of arrival. Finally, Term Extractor 48 dispatches the terms to real-time Indexing module 57.

The purpose of Real-time Indexing module 57 is to provide a search capability of text received in the close past. Real Time Indexing module 57 receives the terms from Term Extractor 48 and stores the operative terms into Term Index 56 which is a dynamic data structure designed to cope with the requirement for fast indexing of terms and for fast deletion of all references to terms related to a specific message. In addition, real-time Indexing module 57 performs a periodic scan for non-used terms in Terms Index 56. Non-used terms are defined as terms that are not referenced for a predefined period of time. Periodically, a garbage collection process is initiated by real-time Indexing module 57 in order to delete the non-used terms.

The search-related element of Terms Index 56 is a data structure containing entries indexed by terms and holding the terms related information such ass a channel ID. As a result, fast insertion and indexing of terms is accomplished.

A more detailed description of the operations related to inserting terms and removing terms from Terms Index 56 will be set forth hereunder in association with the related drawing.

Queries are initiated by users. User communication modules 66, 68, and 70 transfer the queries from the user into the Search Engine modules. Queries hold one or more terms. Conveniently, the handling of a query by the Search Engine modules is analogues to the handling of an incoming message. Queries are filtered by Query Filter 64, and handled by Queries Coordinator 61. Queries Coordinator 61 functions in respect to the incoming queries in a like manner to Messages Coordinator 50 functions in respect to the incoming messages. Queries Coordinator 61 receives the queries from user communication modules 66, 68, and 70 and transfers the queries to the Term Extractor 60. Term Extractor 60 parses the queries and stems the resulting tokens. The tokens are filtered by a series of Terms Filters 63, structured into query-terms by the attachment of control information such as query Id and time-stamp and returned to Queries Coordinator 61 to be inserted into Queries Index 58 in order to be matched later against the operative terms in Terms index 56.

Queries Index 58 holds query-terms for a predefined period of time to enable queries to be matched against the stream of incoming message terms. Queries index 58 thus provides the capability to collect future results to queries. The above mentioned capability is accomplished in conjunction with the Future Search module 59.

Future Search module 59 operates in conjunction with the Queries Index 58 by matching terms from incoming stream of messages against a database of relatively static queries. Said data base can hold alert criteria and dispatch an alert to a client system when an alert criteria is matched. Subsequently a query that was initiated in the past can be matched against newly inserted terms as long as the query is kept in the Queries Index 58. This type of search is defined as the "future search mode" in contrast to the "real-time search-mode".

Query and Results Manager 55 handles the query-terms and provides query results by fetching query-terms from Queries Index 58 through Queries Coordinator 61, dispatches the query-terms to the different result sources, collects the results and builds a unified result to be sent back to the user that initiated the original query.

There are three operative result sources/three matching modes: (a) Real-time search, (b) Archive search, and (c) semi-static database search. Although the Future search functions separately from the other result sources in a different embodiment of the present disclosure future search results may be unified with the search results.

Query and Results Manager 55 establishes a unified result from all result sources (excluding future-search-mode). Query and Result Manager 55 sends the results to the users structured as sorted lists of channel IDs and a score for each channel representing a channel/query match.

Scoring, or ranking of channels to be returned as a result, is done using a model that computes the similarity between the query and the channel. Some of the parameters involved in computing the results are: Total amounts of terms in channel in the predefined time interval, number of relevant terms in the channel in the predefined time interval, total number of channels searched in the predefined time interval, elapsed time since the last appearance of the relevant term in the channel in the predefined time interval and relevant terms position in the channel. Additional factors for the score: terms in proximity to relevant term, part of speech of relevant terms, relevant term frequency and importance in the language of the channel.

The parameters enable Query and Results Manager 55 to rank the resulting channels, in addition to standard ranking methods by the time parameter as well by giving more weight to phrases than to the collection of single words.

Figure 3:
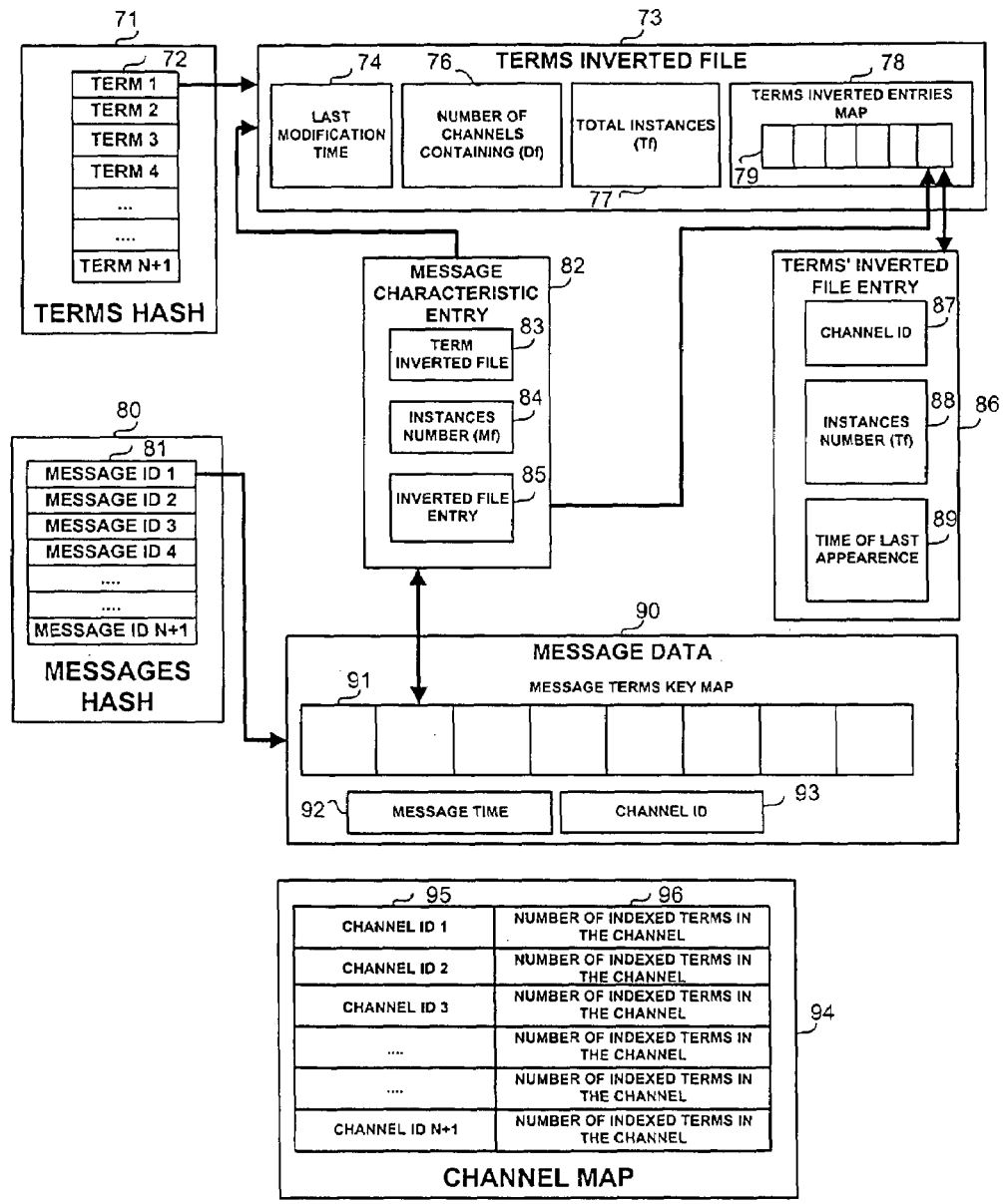
FIG. 3 is a simplified block diagram that illustrates the structure of the Terms Index tables, in accordance with a preferred embodiment of the present disclosure.

Referring now to FIG. 3 that illustrates the structure of the Terms Index 56 tables. The Terms Index consists of two main units: The Terms Hash 71 and the Messages Hash 80. Additionally Terms Index contains the Channel Map unit 94.

Terms Hash 71 comprises the Term table 72 and the associated Terms Inverted File 73. The Term Hash 71 comprises of entries whose keys are terms. Therefore, Term Hash 71 provides fast access to the entries by using terms as access keys. The said structure also provides for fast insertion of terms into the table.

The Terms Inverted File 73 comprises of a sorted list of Terms Inverted Entries Map 78 and at least one of the following files: (a) a total number of references (Total Instances) 77 to the term in all the messages currently stored in Messages Buffer 52 of FIG. 2, (b) the modification time of the term (Last Modification Time) 74, or (c) a number of channels that contain the term 76. Each entry, such as entry 786 in Terms Inverted Entries Map 78 is keyed by the channel ID 87 and has the number of references (Instances No) 88 to the term in that channel and the time of the last appearance of the term in the channel (Time of Last Appearance) 89. The number of references that are added to the Total Instances 77 could be used to determine the channel's relevance to a specific query.

Messages Hash 80 indexed by Message ID 81 in order to provide fast deletion of term's references by message. Messages Hash 80 comprises Message ID table 81 and the associated Message Data table 90. Each entry in Message Data table 90 contains information about one message and pointed to by a Message Hash entry 81. Message Data table 90 consists of (a) the channel ID 93 (b) message time 92, and (c) Message Terms Keyed Map 91. The Message Terms Keyed Map 91 is a sorted list of Message Characteristics Entries 82. A pointer 83 keys each entry, which is unique to each term. Therefore, a Message Characteristics Entry 82 can be found easily by a specific term. Message Characteristics Entry 82 contains the following information: (a) the number of times the related term was referred to in the relevant message (Instances No) 84, and (b) a pointer to the related Inverted File Entry 85.

The Channel Map 94 is a list sorted by channel IDs 95. For each channel ID 95, Channel Map 94 holds the total number of currently indexed terms that belong to the channel 96. In the preferred embodiment of the present disclosure, said total number relates to the number of terms after filtering. In a different embodiment of the present disclosure, the total number could relate to the number of terms before filtering or to the average of both values.

The operations supported by the Terms Index 56 of FIG. 2 will be described next. Terms Index 56 of FIG. 2 supports three modes of operation: (1) term insertion, (2) terms deletion by message ID, and (3) term deletion by the garbage collection process.

Term insertion is performed by Term Extractor 48 of FIG. 2 when handling a newly extracted term from an incoming message. The term is indexed in this mode of operation by Term, Message Id, Channel Id and Message Time. When inserting a Term the following sequence of steps is performed:

One) the Term 72 to Terms Inverted File 73 link is accessed or created. A pointer to Terms Inverted File (invertedFilePtr) is saved.

Two) the Total Instances 77 member's value in Terms Inverted File 73 pointed at by invertedFilePtr is increased by one.

Three) the Last Modification Time 74 member in Terms Inverted File 73 pointed at by invertedFilePtr is updated.

Four) the entry for channel Id 87 in Terms Inverted Entries Map 79 is accessed or created. A pointer to the entry is saved as invertedFileEntryPtr.

Five) the value of Instances No 88 member in the entry pointed at by invertedFileEntryPtr is increased by one.

Six) the appropriate Message Data is accessed or created in Message Hash 80. A pointer to the entry is saved as messageData.

Seven) the Message Characteristic Entry 82 in Message Data 90/Message Terms Keyed Map 91 is accessed by invertedFilePtr or created. A pointer to the entry is saved as messageCharac.

Eight) in the entry pointed at by messageCharac the value of Instances Number 84 member is increased by one.

Nine) in the entry pointed at by messageCharac, the invertedFileEntry pointer is set to point at invertedFileEntryPtr.

Ten) in the Message Data 90, the Message Time 92 member is updated.

Eleven) in the Message Data 90 the channel ID 93 member is updated.

Term deletion by Message Id occurs when a message is deleted. A message can be deleted when the Messages Buffer 52 of FIG. 2 is full or a predetermined time interval indicative of the period a message should be kept in the buffer 52 has been completed. For term deletion by Message Id the following sequence of steps is performed:

One) the appropriate Message Terms Keyed Map 91 is obtained from Messages Hash 80.

Two) for each Message Characteristics Entry 82 that points to Terms Inverted File 73:

Three) the pointed Terms Inverted File 73 is accessed and Total Instances 77 member's value is decreased by the Instances No 84 member's value in Message Characteristic Entry 82.

Four) the Term Inverted Entry 86 is accessed and the Instance Number 88 value is decreased by Message Characteristic Entry's local Instances No member 84 value.

Five) Message Characteristic Entry 82 is deleted.

Six) steps 'c' through 'e' are repeated until Message Terms Keyed Map 91 is empty.

Seven) the Message Id 81/Message Terms Keyed Map 91 link is deleted.

Deleting a term not via Message Id 81 is done periodically by the garbage collecting process. The deletion is performed if the term's last modification time occurred before a specific point in time in the past which implies that there are currently no messages that the specific term refers to or that the term's Total Instances 77 member's value equals zero. When a term is found that satisfies the above conditions a simple deletion of the Term 72 to Terms Inverted File 73 link is performed.

Conveniently, system 1 can provide real time alert by various manners. According to a first embodiment of the invention, future search module 59 matches a plurality of alert criteria against the content of terms index 56. According to a second embodiment of the invention, terms index 56 has additional field, associated to each term, indicating whether said term is a part of an alert criteria or not. If so—said term is not deleted from terms hash 71 unless a client system requested to delete it. When a real time search is performed, the whole content of the terms hash is checked, while an alert is based upon a check of only the terms identified as a part of the alert criteria.

Figure 4:
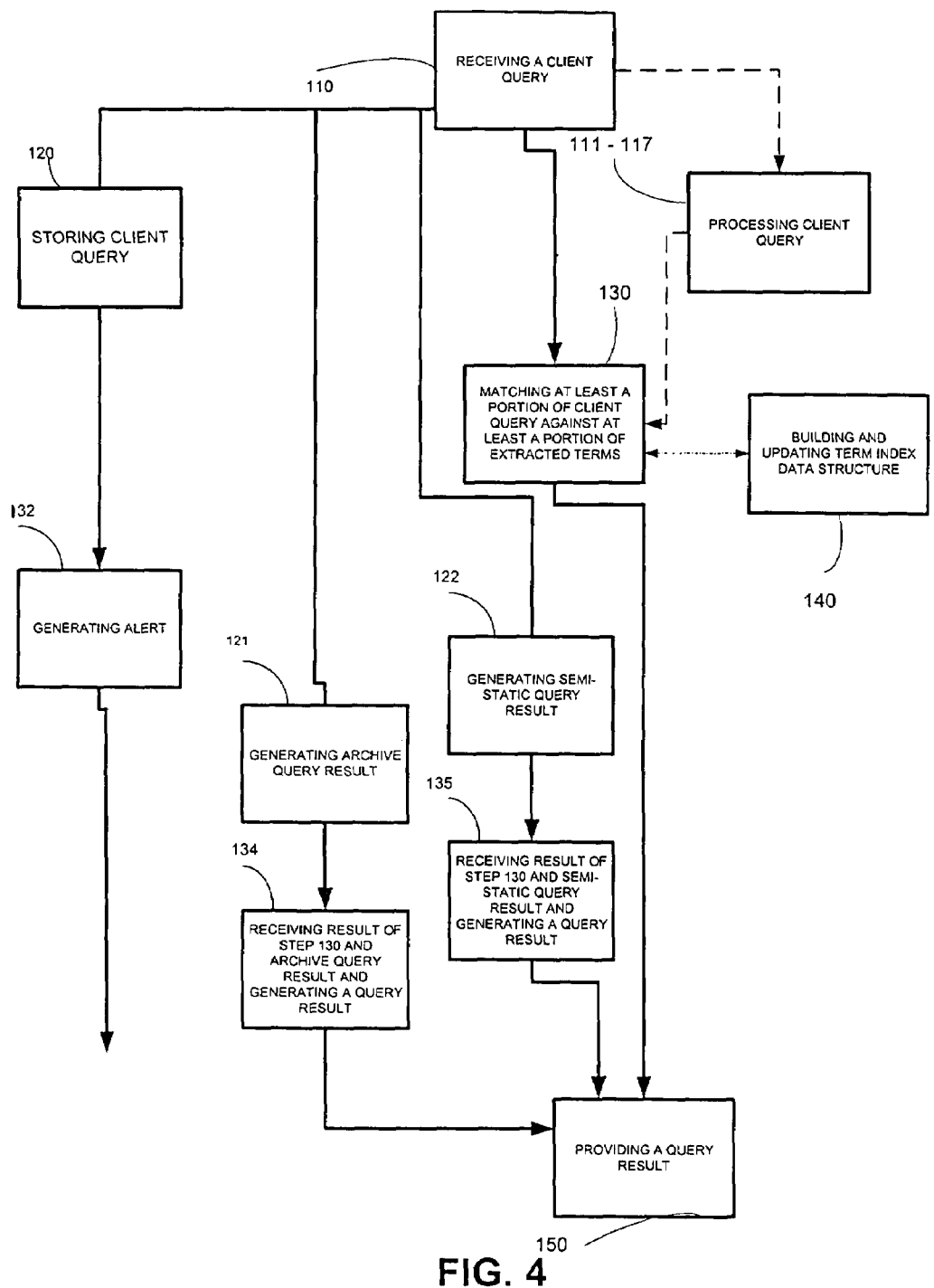
FIGS. 4–6 are flow chart diagrams illustrating a method for real time search.
Figure 5:
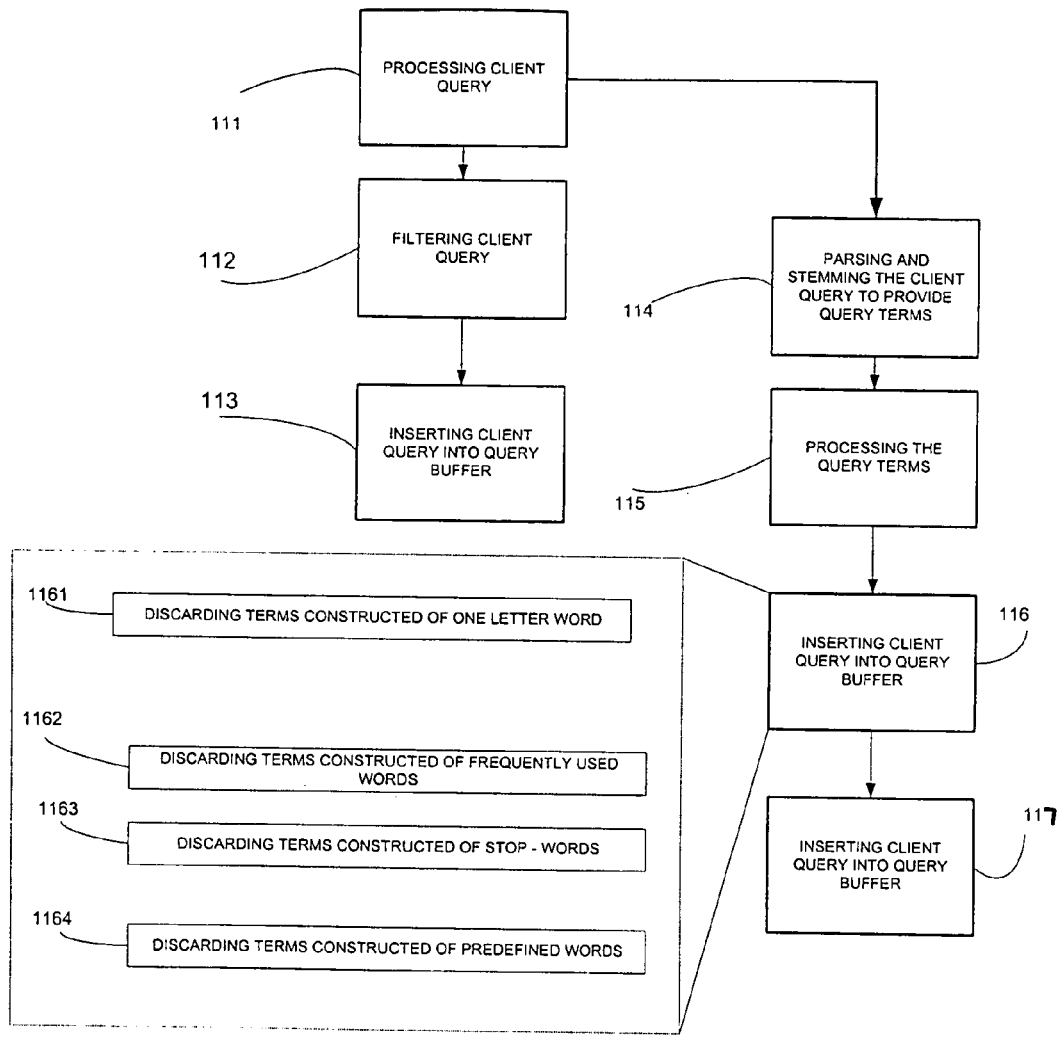
Figure 6:
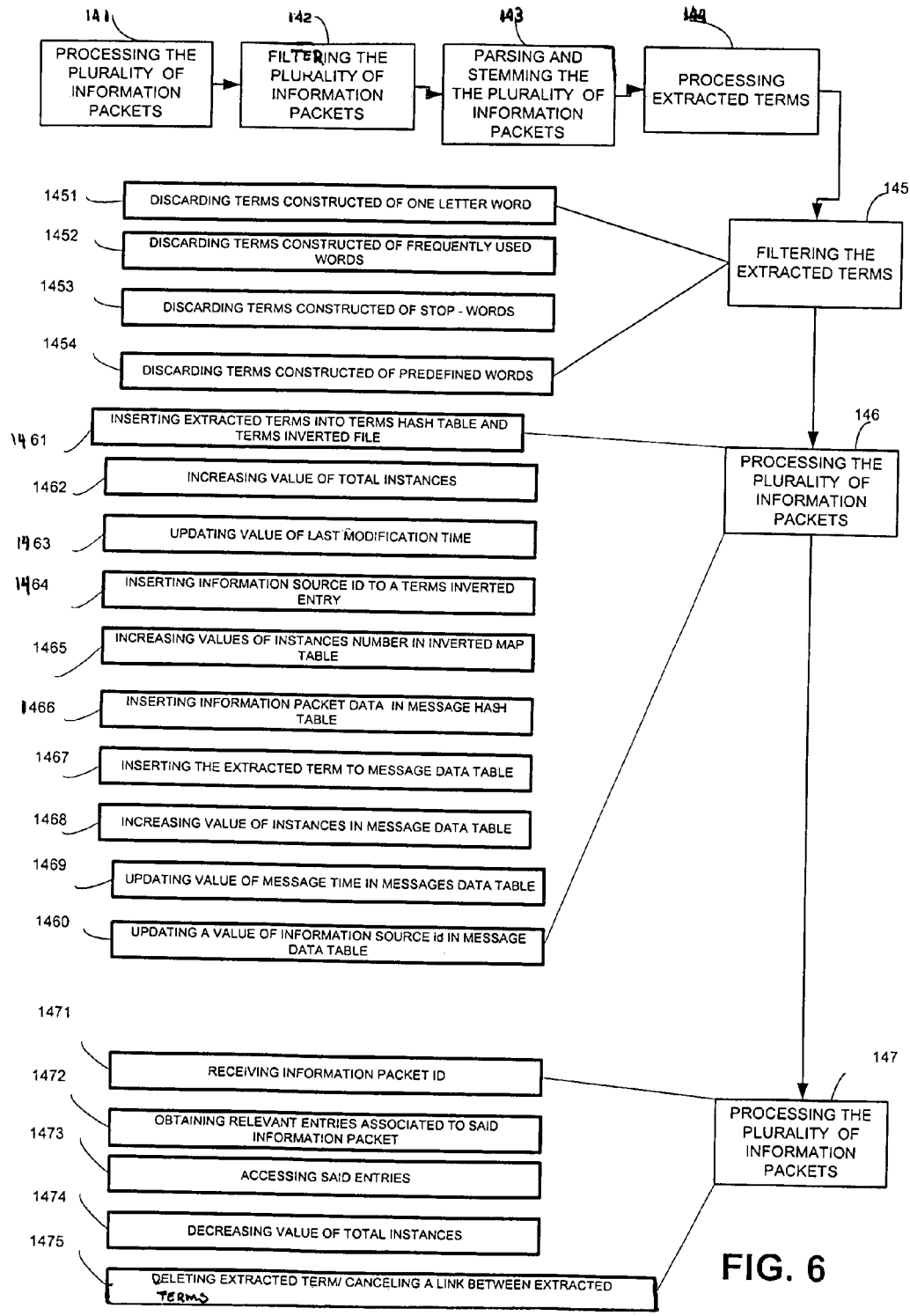

Referring to FIGS. 4–6 illustrating a method 100 for real time search, method 100 comprising steps 110, 130 and 150 and additional optional steps. Method 100 starts at step 110 of receiving a client query, said client query regards a content of at least one information packet. Step 130 is followed by step 130.

Step 130 of matching at least a portion of said client query against at least a portion of a plurality of extracted terms to generate a query result, said extracted terms being extracted out of a plurality of information packets provided from a plurality of information sources, said extracted terms are stored in a storage means for up to a predetermined period of time. Conveniently, the storage means is a term index data structure.

Conveniently, step 130 is preceded by step 140 of building and updating the term index data structure. Step 140 comprising of at least one of the following steps: Step 141 of processing the plurality of information packets by adding control data to said information packets. The control data comprising of information packet identification, information source identification and time of arrival. Step 142 of filtering the plurality of information packets. Step 143 of parsing and stemming the plurality of information packets. Step 144 of processing said extracted terms by adding control information to said extracted terms. Step 145 of filtering the extracted terms to generate filtered extracted terms. Preferably, step 145 further comprising at least one of the following steps: step 1451 of discarding said terms constructed of one-letter words; step 1452 of discarding said terms constructed of frequently used words; step 1453 of discarding said terms constructed of stop-words and step 1454 of discarding said terms constructed of predefined words.

Step 146 of storing an extracted term in a term index data structure. Step 146 is preferably comprising following steps: step 1461 of inserting the extracted term into a terms hash table and into a terms inverted file; step 1462 of increasing a value of total instances in said terms inverted file; step 1463 of updating a value of last modification time in said terms inverted file; step 1464 of inserting an information source identification, said information source provided the extracted term, to a terms inverted entry map table in said terms inverted file; step 1465 of increasing a value of instances number in said inverted entry map table associated with said information source identification in said terms inverted file; step 1466 of inserting information packet data in a messages hash table; step 1467 of inserting the extracted term from said information packet to a messages data table; step 1468 of increasing a value of instances in said messages data table by one; step 1469 of updating a value of message time in said messages data table; and step 1460 of updating a value of information source identification in said message data table.

Step 146 is followed by step 147 of deleting the extracted term from the terms index data structure. Said deletion occurs either after a message from which said term was expired is stored in the message buffer for a predetermined period of time. Said term can also be deleted as a result of a garbage collection process, said process is based upon a deletion of terms that are not mentioned during a certain period.

Preferably, step 147 comprising the steps of: step 1471 of receiving an information packet identification, whereas the terms extracted from the information packets are to be deleted; step 1472 of reading the information packet identification from the messages hash table in said terms index data structure; step 1472 of obtaining relevant entries of said extracted terms belonging to said information packet in said messages data; step 1473 of accessing said terms inverted file for each said terms entry pointed to said terms inverted file; and step 1474 of decreasing a value of said total instances by a value of said instances number for each said terms entry pointed to said terms inverted file. Step 147 further comprises of step 1475 of deleting an extracted term by a garbage collection process and canceling a link between said term in said terms hash table and said terms inverted file is canceled.

Conveniently, step 110 is followed by step 111 of processing the client query by adding control data to said client query. Step 110 is followed by step 112 of filtering the client query. Said filtering involves excluding said information packets generated from predefined client systems. Step 110 is also followed by step 114 of parsing and stemming the client query to generate query terms. Step 114 is followed by step 115 of processing the query terms by adding relevant control information to the query-terms. Step 115 is followed by step 116 of filtering said query terms. Step 116 further comprising of at least one of the following steps: step 1161 of discarding said terms constructed of one-letter words; step 1162 of discarding said terms constructed of frequently used words; step 1163 of discarding said terms constructed of stop-words; and step 1164 of discarding said terms constructed of predefined words. Step 116 is followed by step 117 of storing said query terms in a term index data structure for a period that is shorter than a predefined period of time or until a query removal request is received from a user.

Conveniently, method 100 allows to perform more than a single search Mode In addition to a first mode in which an incoming client query is matched against a content of the storage means, method 100 comprises of steps 120, 121 and 122 for allowing additional search modes. When more than a single search mode is selected, results of some search modes are unified to provide a single search result.

A path comprising of steps 120 and 132 allows to provide alerts. Said path starts by step 120 of storing client queries follows step 110. Conveniently, step 120 comprising of s a step of updating query index 58. Step 120 is followed by steps 132 of matching client queries/alert criteria received and processed in the past against newly received terms to generate an alert.

Step 121 of matching the client query against historical archives of informational content to generate an archive query result is followed by step 134 of processing the archive query result and a result of the step 130 to generate the query result.

Step 122 of matching the client query against a semi-static database of said informational content and having a low incidence of changing to generate a semi static query result, is followed by step 135 of matching the client query against the semi-static database is followed by a step of processing the semi static query result and a result of the step of matching at least a portion of said client query against at least a portion of a plurality of extracted terms to generate the query result.

Conveniently, a query result comprises of at least one information source, said at least information source provided a matching information packet. Step 130 further comprises a step 136 of ranking information sources according to a similarity between at least a portion of information packets provided by said information sources and between the client query. Preferably, said ranking process is based upon at least one of the following parameters: (a) a total amount of extracted terms provided by an information source in a predefined time interval; (b) an elapsed time since the extracted term was provided by the information source in said predefined time interval; and (c) an extracted term position in the information source.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather then the foregoing detailed description.

We claim:

1. A system for real time search, adapted to receive a client query originated by a client system, to receive a plurality of information packets provided by a plurality of information sources or representative of a portion of a signal provided by the plurality of information sources, and to generate query results to be provided to the client system, the system comprising:
    an information packet processor, for receiving an information packet and for processing the information packet to generate at least one processed portion of the information packet, wherein the at least one processed portion of the information packet is an at least one extracted term;
    storage means, coupled to the information packet processor and to a storage means, for temporarily storing information representative of a reception of the at least one processed portion of the information packet, the storage means being configured to allow fast insertion and fast deletion of content;
    a query and result manager, coupled to the storage means, for matching a received client query against at least a portion of a content of the storage means to generate a query result; and
    at least one module selected from a group of modules consisting of:
        a message coordinator module adapted to coordinate a handling of a plurality of information packets;
        a message buffer adapted to hold temporarily the plurality of information packets;
        a message filter module for filtering the plurality of information packets according to predefined rules;
        a term extractor module for performing parsing and stemming on said plurality of information packets;
        a terms filter for excluding extracted terms according to predefined rules;
        a queries coordinator module to coordinate the processing of client queries;
        a query-term extractor to parse and stem incoming queries in order to extract and process operative query-terms;
        a query-terms filter for excluding specific query-terms in a predefined manner;
        an archive search module for indexing data on archive files containing historical informational content and for returning results according to said indexed data;
        a semi-static database search module to act on a semi-static database holding semi-static information source control data;
        a future search module for matching extracted terms from the plurality of information packets against static queries; and
        a queries index for holding queries for a predefined time frame to provide means of future search.

2. The system of claim 1, wherein the storage means is a term index data structure.

3. The system of claim 2 wherein the term index data structure is adapted to hold indexed extracted terms and information packet identifiers.

4. The system of claim 3 wherein the term index data structure further comprises:
    a terms hash table to hold extracted, filtered and processed terms;
    a terms inverted file pointed to by said term hash table holding a terms inverted entry map;
    a messages hash table to hold information packets identification;
    a messages data table to hold information packets data; and
    a channel map to hold a list of information sources and the related number of index terms of said information source.

5. The system of claim 4 wherein the terms inverted file further comprises:
    a terms inverted entries map table;
    a total instances of said term;
    a number of information sources containing said term; and
    a last modification time of said term.

6. The system of claim 5 further comprising:
    a message terms keyed map;
    an information source identification; and
    an information packet time of arrival.

7. The system of claim 6 wherein the message terms keyed map further comprises:
    a pointer to said terms inverted file;
    an instances number of said term in said information packet; and
    a pointer to said inverted file entry related to said term.

8. The system of claim 7 wherein the teams inverted entries map further comprises:
    an information source identification;
    an instances number of said term in said information source informational content; and
    a time of last appearance of said term in said information source informational content.

9. The system of claim 1 wherein said storage means allows fast insertion and deletion of content.

10. The system of claim 1 wherein the storage means further allows timely deletions of irrelevant or time-decayed terms and query-terms.

11. The system of claim 1 further comprising a means selected from the group consisting of:
    adding means for adding control data to said information packets;
    filtering means for the plurality of information packets;
    processing means for said extracted terms, to add control information to said extracted terms; and
    term filtering means for the extracted terms to generate filtered extracted terms.

12. The system of claim 11 wherein the control data comprises information packet identification, information source identification and time of arrival.

13. The system of claim 1 wherein the extracted terms are extracted out of the plurality of information packets by parsing and stemming the plurality of information packets;

and wherein the term filtering means are adapted to (a) discard said terms constructed of one-letter words; (b) discard said terms constructed of frequently used words; (c) discard said terms constructed of stop-words; and (d) discard said terms constructed of predefined words.

14. The system of claim 1 further adapted to receive an information packet; to store the information packet with an associated packet identifier in an information packet storage means; to store extracted term information representative of a reception of at least one extracted term, said at least one extracted term extracted from the information packet; and to link between the stored information packet and the extracted term information.

15. The system of claim 14 further adapted to delete an information packet and delete the linked extracted term information.

16. The system of claim 14 wherein information packets are stored in a messages hash, and wherein the linked extracted term information is stored in a terms hash.

17. The system of claim 16 wherein the extracted term information comprises at least one information field selected from a group consisting of:
  a last modification time field, indicating a most recent time in which the extracted term was received;
  a number of channels containing term, indicating a number of information sources that provided the extracted term;
  a total instances field, indicating a number of times the extracted term was provided; and
  a terms inverted entries map, comprising a plurality of terms inverted file entries, each entry holding information representative of a reception of the extracted term from a single information source.

18. The system of claim 17 wherein each inverted file entry comprises at least one field selected from a group consisting of:
  a channel identifier, for identifying the information source that provided the extracted term;
  an instances number, for indicating a number of times the extracted term was provided by an information source; and
  a time of last appearance, for indicating a most recent time in which the extracted term was received from an information source.

19. The system of claim 18 wherein each information packet is further associated to a message terms key map, said message terms key map comprising of a plurality of message characteristic entries, each message characteristic entry associated to an extracted term being extracted from the information packet, said message characteristic entry comprising at least one field selected from a group consisting of:
  a term inverted file, for pointing to the term extracted information;
  an instance of number, for indicating a number of times said extracted term appeared in the information packet; and an inverted file entry, for pointing to a terms inverted file entry.

20. The system of claim 1 further adapted to insert an extracted term into a terms hash table and into a terms inverted file; insert an information source identification, said information source providing the extracted term to a terms inverted entry map table in said terms inverted file; insert information packet data in a messages hash table; insert the extracted term from said information packet to a messages data table; increase a value of instances in said messages data table by one; and update a value of information source identification in said message data table.

21. The system of claim 20 further adapted to extract an extracted term and accordingly to perform at least one operation selected from a group consisting of:
  increase a value of total instances in said terms inverted file;
  update a value of last modification time in said terms inverted file;
  increase a value of instances number in said inverted entry map table associated with said information source identification in said terms inverted file; and
  update a value of message time in said messages data table.

22. The system of claim 1 further adapted to delete an information packet, and accordingly to perform at least one operation selected from a group consisting of:
  receive an information packet identification, whereas the terms extracted from the information packets are to be deleted;
  read the information packet identification from a messages hash table in a terms index data structure of said storage means;
  obtain relevant entries of said extracted terms belonging to said information packet in said messages data; and
  access a terms inverted file of said storage means for each terms entry pointed to in said terms inverted file.

23. The system of claim 1 further adapted to store alert criteria and to match alert criteria received and processed in the past against newly received terms to generate an alert.

24. The system of claim 1 further adapted to match the client query against historical archives of informational content to generate an archive query result.

25. The system of claim 24 further adapted to generate a query result from an archive query result and from a recent query result.

26. The system of claim 1 further adapted to match the client query against a semi-static database of said informational content and having a low incidence of changing to generate a semi-static query result.

27. The system of claim 26 further adapted to generate a query result from a semi-static query result and from a recent query result.

28. The system of claim 1 further adapted to rank information sources according to a similarity between at least a portion of information packets provided by said information sources and between the client query.

29. The system of claim 28 further adapted to insert a list of ranked information sources in the query result.

30. The system of claim 29 wherein the step of ranking is based upon a parameter out of a group consisting of: a total amount of extracted terms provided by an information source in a predefined time interval; an elapsed time since the extracted term was provided by the information source in said predefined time interval; and an extracted term position in the information source.

31. The system of claim 1 wherein an information source is selected from a group consisting of: television broadcast providers; radio broadcast providers; data network providers; chat channels providers; news providers; and music providers.

32. The system of claim 1 wherein information packets comprise content selected from a group of: text, audio, video, multimedia, and executable code streaming media.

33. The system of claim 1 further adapted to compute a similarity between a client query and a group of at least one information packet.

34. The system of claim 33 wherein the group of at least one information packet comprises at least one information packet received from a single information source.

35. The system of claim 1 wherein the similarity reflects at least one parameter selected from the group consisting of:
- a total amount of extracted terms being received from at least one information source during a predefined time interval;
- a number of relevant extracted terms being received from at least one information source during the predefined time interval;
- a total number of information sources being searched during the predefined time interval;
- an elapsed time since a last appearance of a relevant extracted term from an information source during the predefined time interval;
- a position of relevant extracted terms in at least one information source in proximity to a relevant extracted term;
- a part of speech of a relevant extracted term; and
- a relevant extracted term frequency and importance in a language of the information source.

36. The system of claim 1 adapted to implement a matching technique selected from a group consisting of:
- Boolean based matching;
- probabilistic matching;
- fuzzy matching;
- proximity matching; and
- vector based matching.

37. The system of claim 1 adapted to implement complex matching techniques.

* * * * *

UNITED STATES PATENT AND TRADEMARK OFFICE
CERTIFICATE OF CORRECTION

| | | |
|---|---|---|
| PATENT NO. | : 6,999,957 B1 | Page 1 of 1 |
| APPLICATION NO. | : 09/655185 | |
| DATED | : February 14, 2006 | |
| INVENTOR(S) | : Zamir et al. | |

It is certified that error appears in the above-identified patent and that said Letters Patent is hereby corrected as shown below:

On the Title page of the patent under Related U.S. Application Data, lines 1-2 the text should read as follows:

(63) Continuation-in-part of application No. 09/481,206, filed on Jan. 11, 2000, and further claiming the benefit of U.S. provisional application Ser. No. 60/180,660, filed Feb. 7, 2000; and In column 1, lines 1-2 under the heading "RELATED APPLICATIONS," the sentence should read as follows:

"This application is a continuation in part of application U.S. Ser. No. 09/481,206 filed Jan. 11, 2000, and further claims the benefit of U.S. provisional application Ser. No. 60/180,660, filed Feb. 7, 2000."

Signed and Sealed this

Eighth Day of August, 2006

JON W. DUDAS
*Director of the United States Patent and Trademark Office*